(12) United States Patent
Ventura et al.

(10) Patent No.: US 10,512,871 B2
(45) Date of Patent: Dec. 24, 2019

(54) DUST COLLECTOR CONTROL SYSTEM

(71) Applicant: GS DE MÉXICO S DE RL DE CV, El Marqués (MX)

(72) Inventors: Pablo De Urquijo Ventura, El Marqués (MX); Alberto Israel Horta Guerra, El Marqués (MX); Erik Real Pindter, El Marqués (MX)

(73) Assignee: GS de México, S. de R.L. de C.V., El Marqués (MX)

( * ) Notice: Subject to any disclaimer, the term of this patent is extended or adjusted under 35 U.S.C. 154(b) by 0 days.

(21) Appl. No.: 15/723,437

(22) Filed: Oct. 3, 2017

(65) Prior Publication Data

US 2018/0093215 A1    Apr. 5, 2018

(30) Foreign Application Priority Data

Oct. 5, 2016 (MX) .................. MX/A/2016/013086

(51) Int. Cl.

| | | |
|---|---|---|
| *B01D 46/46* | (2006.01) | |
| *F24F 11/39* | (2018.01) | |
| *F24F 11/77* | (2018.01) | |
| *F24F 13/28* | (2006.01) | |
| *F24F 11/64* | (2018.01) | |
| *B01D 46/00* | (2006.01) | |
| *B08B 15/00* | (2006.01) | |
| *B01D 46/44* | (2006.01) | |
| *B01D 46/02* | (2006.01) | |

(Continued)

(52) U.S. Cl.
CPC ..... *B01D 46/0086* (2013.01); *B01D 46/0045* (2013.01); *B01D 46/023* (2013.01); *B01D 46/444* (2013.01); *B01D 46/446* (2013.01); *B01D 46/46* (2013.01); *B08B 15/002* (2013.01); *F24F 7/025* (2013.01); *F24F 11/39* (2018.01); *F24F 11/77* (2018.01); *F24F 11/64* (2018.01); *F24F 13/28* (2013.01); *F24F 2110/10* (2018.01); *F24F 2110/40* (2018.01)

(58) Field of Classification Search
CPC ........ B01D 46/00; B01D 46/02; B01D 46/04; B01D 46/44; B01D 46/46; B01D 46/0068; B01D 46/444; B01D 46/0086; B01D 46/0023; B01D 46/446; F24F 1/0007; F24F 3/16; F24F 11/30; F24F 11/79; F24F 2120/10; F24F 2120/14; F24F 11/39; F24F 11/77; F24F 7/025; F24F 13/28; F24F 11/64; F24F 2110/10; F24F 2110/40
USPC ..... 55/283, 302, DIG. 34; 95/15, 20, 25, 26, 95/280; 96/399, 417, 420, 421, 422, 425, 96/428; 454/192; 700/273
See application file for complete search history.

(56) References Cited

U.S. PATENT DOCUMENTS 5,711,785 A * 1/1998 Maxwell .............. B01D 46/002
55/283
8,734,578 B2 * 5/2014 Miki .................... F24F 1/0007
96/397

(Continued)

*Primary Examiner* — Minh Chau T Pham
(74) *Attorney, Agent, or Firm* — Berenato & White, LLC

(57) ABSTRACT

A control system integrated into an industrial dust collector. The system has at least one programmable processing unit that communicates with a plurality of sensors located in the dust collector to provide data of the collector's behavior with feedback allowing real-time modifications to the operating parameters defined during the design. Additionally, a service-life prediction element of used-filters based on a reference chart is included.

7 Claims, 4 Drawing Sheets

(51) Int. Cl.
    *F24F 7/02*       (2006.01)
    *F24F 110/10*    (2018.01)
    *F24F 110/40*    (2018.01)

(56) References Cited

U.S. PATENT DOCUMENTS

2011/0265652 A1\*  11/2011  Gu ........................ B01D 46/02
                                                                                                              95/283
2013/0255485 A1\*  10/2013  Appelo ................. B01D 46/04
                                                                                                               95/20

\* cited by examiner

DUST COLLECTOR CONTROL SYSTEM

CROSS REFERENCE TO RELATED APPLICATION

This application claims priority to Mexican Patent Application No. MX/a/2016/0113086, filed on Oct. 5, 2016, the contents of which are incorporated herein by reference in its entirety.

FIELD OF THE INVENTION

The present invention relates to the mechanical and electrical field, but more particularly to the field of the dust collectors at industrial level, as a dust collector control system which identifies and integrates a plurality of implied variables and likewise allows predicting the filters' service-life and the real-time monitoring of the components that are used in said system.

BACKGROUND OF THE INVENTION

Dusts are small solid particles, created by the breakage of larger particles that are usually the product of an industrial activity such as grinding, polishing, drilling, baulking, etc. Also, in addition to dusts there are fumes, mists and vapors, which are also part of industrial activities.

Dust collectors are devices that extract air with particles of dust or various materials of a process, directing the flow of extracted air to a tiller device, which separates dust or particles of materials from the airstream that is sent then into the atmosphere through discharges of clean air. These devices are used to, either, collect valuable material in a process, wherein said material is in the form of solid particles or dusts, or to remove polluting or unwanted material, likewise, wherein said material is in the form of solid particles or dusts.

Dust collectors are used to collect dust generated in different processes in the industry, they are used to recover the product and send it back to the process or to control areas with rising dust where health, hygiene, cleaning and the environment can be affected. In both cases, the correct selection of the dust collector represents energy and resource savings, as well as the option to recover the collected dust, for possible reuse.

In the art, a dust collector is defined by a device which sucks, using an airstream normally generated by a centrifugal fan, solid particles which are transported in ducts and introduced into said collector first in a dirty air chamber which is also called "dirty chamber". This air then passes through a medium, filter, or also called filter fabric, to a second inner chamber of the collector called clean air chamber or also called "dirty chamber", with the solid particles remaining on the outside of the filter. The clean chamber and the dirty chamber are separated from each other by a plate or "mirror" with holes where the filters are placed, of so that there is only communication between the two chambers through said filters or filter medium. The subject matter of said filter medium varies according to the application, environment and size of the dust to be collected.

Dust collectors, typically use one of two types of filter means such as textile technology and paper or cellulose technology called bag filters and cartridge filters. Both may now include synthetic fibers or polymers in addition to surface finishes and treatments in an attempt to cover the range of pollutants and mixtures of pollutants generated in the industrial processes.

Thus, in a constant use, the filters tend to become saturated, since the dusts are adhered in said filters causing a reduction in the flow in the side of the clean chamber, therefore, it is necessary to clean the filters of the excess of dusts during the same use while maintaining said dust collector. Nowadays, the most used means of cleaning the filters is the so-called PulseJEt which consists of pulses of compressed air coming from at least one jet pipe or flute pointing at the filter from the clean chamber periodically cleaning it. This compressed air pulse is applied in direction opposite to the general flow and passes into of each filter through a venturi which creates a secondary air of several times its volume, this effect causes the dust adhered in the surface layer of the filter to be removed to fall into a hopper by gravity and it is subsequently accumulated in a storage bin.

The jet pipe has a compressed air tank, this pipe is attached and closed at one end and opened on the opposite side, leaving the pipe on the outside of the clean air chamber, to connect to a diaphragm valve having an electrically operated valve coupled and these in turn are connected to the timer, which regulates the interval between the compressed air blasts and the duration thereof, which in turn is controlled by a central unit, that is, the collector is operated automatically at predefined time intervals.

The product removed from the filters is collected in the hopper, wherein said product can be exhausted through a rotary valve, helical conveyer, etc.

Also, it is common in the art to add an optionally electronic differential manometer, which indicates the pressure difference between the two chambers resulting from the saturation of the filter with the pollutant by circulating a flow rate through the filter medium, automatically starting the self-cleaning system defined by the compressed air blasts in accordance with said pressure difference detected.

In order to implement a dust collector system, all factors already known in the art, such as location, number of extraction points to machines or workstations and their corresponding configuration, characteristics of the type or types of pollutant, toxicity, level of explosiveness, size, density and shape of the pollutant particle, standards and regulations, energy or power required for capture-transport-filtration, safety elements, temperature, etc. must be considered.

In this respect, it is important that the filters operate with the flow rate designated during the design stage of the system, wherein there is a corresponding air-fabric ratio considering the varying saturation of the filters.

Additionally, in the art it has been identified that the fan power is dimensioned considering that the filters are saturated, that is, a saturation power or also called full power.

Also, it has been identified that at full fan power and using new filters, the filters' service-life is reduced compared to non-new filters, since said full power with new filters is reflected in a higher flow rate, therefore, the air-fabric ratio is forced, that is, the pollutant particles reach said new filters with at a relatively high speed whereby they are deeply embedded in the fibers of the filter making it more difficult to detach them. In certain cases, said particles may penetrate or break said filter.

Likewise, in the art, the way in which a saturation in the dust collector filters is identified through a comparison between a pressure measurement in the dirty chamber and the environment pressure assuming that any change in the pressures means a saturation or non-saturation of said filters, so that before this condition the flow rate is adjusted. That is, based on the differences of static pressure measurements between the environment and the dirty chamber, the power of the collector is adjusted to reach to the value corresponding to the design flow rate, or initial operating parameters.

However it has been identified that this art presents several imprecisions, since the pressure difference can be originated by factors external to said saturation or non-saturation of a filter, since the ductwork of the dust collector is likely to present accumulations which saturate said ductwork, since it is common for pollutants other than the expected dusts to be absorbed at the workstations usually due to some human error such as fabrics, bottles, paper, waddings, among other work elements whereby a system considering these factors is desirable. This is common in dust collector systems wherein there is a plurality of workstations with complex non-linear duct systems.

In this respect, it has also been identified that once the dust has been collected in a bin or container, the speed at which said bin is saturated varies depending on the dust collected, the workstations, etc., wherein once the bin is saturated, the collector operates imprecisely, since the saturation of the bin causes the dusts not to be ejected, which also causes the filters to saturate. In this respect, techniques have been developed to monitor the saturation of the bin, however, these techniques are not sufficiently precise with respect to providing continuous measurements, which is desirable to identify when it is necessary to empty said bin.

Thus, it is desirable to develop a dust collector control system which prevents the reduction of the new filters' service-life through actual-time adjustments. Additionally, it is desirable to develop a dust collector control system that allows monitoring and control of the variables involved in the collection process, so that the corresponding adjustment is allowed in real time and in advance. Likewise, it is desirable for the system to include continuous and actual-time monitoring of the saturation level of the bin. Likewise, based on the data, measurements and calculations, it is possible to evaluate algorithms to make predictions about system components' faults or service-life.

SUMMARY OF THE INVENTION

The present invention is comprised of a system coupled to a dust collector, wherein the system includes a central unit also called brain comprised of either a computer, a microprocessor or a microcontroller having a memory with data or operating parameters of the collector, and digital and analog inputs and outputs; a port for the plurality of analog and digital inputs and outputs with electronic, electrical and/or electromechanical means enabling compatibility with each element or means of the system, including a plurality of sensors of different types located in different parts of the system for collecting operating data; and a communications port compatible with industrial equipment; a variable-frequency drive connected to the suction fan motor of the dust collector to shift its operating frequency; a power source; and a user interface.

The sensor type within the plurality of sensors is defined by at least one sensor from the list of: compressed air pressure sensor, triboelectric sensor for detecting broken bags, Rate-of-Rise (ROR) heat sensor for fire detection, fire equipment activation sensor, pressure sensor for cleaning filters, anemometer for measuring airstream at the stack outlet, current sensor for failure detection in the filter cleaning electrically operated valves, pivoting sensor for rotary valve and/or helical conveyer in the dust discharge of the collector, hopper level sensor, dust bin level sensor, infrared spark sensor in the extraction ductwork, etc.

In an embodiment of the invention, the user interface is a graphical user interface implemented via an electronic display in operational communication with the brain, wherein operation data is displayed. In another embodiment of the invention, said display is a display including a touch panel that allows a bi-directional exchange of information between the central unit and a user. In an embodiment of the invention, the touch panel is integrated in the electronic display.

In an embodiment of the invention, the system includes a variable-frequency drive (VFD) coupled to the brain, wherein said drive allows the fan frequency to be shifted in real time, that is, while the collector system is in operation.

In an embodiment of the invention, the variable-frequency drive includes a PID control (proportional-integral-derivative control) coupled to said drive to maintain the static system pressure by increasing or decreasing the motor frequency. In an embodiment of the invention, the PID configuration is calculated and programmed during the installation and tuning of the drive based on the measured data during the starting. Thus, the element that closes the PID control loop in is the brain which provides the drive with the necessary data for its corresponding operation.

In an embodiment of the invention, the system includes a temporary variation in the design parameters, which allows avoiding the reduction of the filters' service-life.

In an embodiment of the invention, the system includes a plurality of sensors located at different points in the system. Said plurality of sensors obtains actual-time measurements on the system's behavior or operation in different parts. Said measurements are sent and interpreted by the brain.

Thus, the brain sends commands to the drive to increase or decrease the operating fan frequency from the data collected in real time to compensate for the variation generated in the filters to maintain the flow and air-fabric ratio of design, this is called flow controller or also system flow rate control.

Said increases and decreases in the frequency whereby the brain or central unit controls the system flow rate, are performed by the following embodiments of the invention:

1. Based on the static pressure measurements between the environment and the dirty chamber being calibrated in the value corresponding to the design flow rate.

Note: this static pressure value may vary in each system, so calibration is required in each case.

2. Interpreting the analog signal of the air speed in the fan exhaust stack. The analog signal comes from an either helical or hot wire speed sensor connected to the brain.

3. By interpreting the Total pressure reading of a Pitot tube installed in the air exhaust stack of the fan.

Note: For option 2 and 3, it is necessary to ensure that the flow is laminar at the reading point, knowing the transverse Area of the outlet duct, the flow rate is known by the formula $Q=V*A$.

It has been noted in the art that there are no efficient methods for assessing the integral status of dust collection systems, thus anticipating a failure by avoiding a negative scenario that in some cases is harmful to the population close to the plant, operators, apart from resulting in losses for the industry.

The present invention, further includes a method for estimating the components' service-life comprising it as the filters being used. In this sense, it has been identified that although the filters are different, have different origin or parts, their behavior chart of pressure drop vs weeks of work, is maintained, so also a standardized behavior chart of filters' service-life is revealed. Through the measurements on the filters, by means of the present invention, data in sequential order, data relating to the flow controller, pressure drops, are obtained and thus, taking into account the characteristics of the filter medium, the characteristics of the pollutant and the temperature, and through mathematical relations the filter's service-life is determined, which allows for early diagnosis to schedule its replacement or maintenance without stopping the plant where the collector is used.

Similarly, to maintain a resource-saving functionality, methods for the system shutdown and startup are included, which vary depending on the application and elements used.

Communication between the brain and other elements such as the variable-frequency drive and/or the different sensors is made by means of a compatible industrial communication bus and/or by analog/digital signals as it is used in the art.

From the signals received from the sensors and/or variable-frequency drive, it is possible to centrally control the elements, components and accessories of operation and safety of a suspended particle collector. Wherein, in addition to the cleaning of the filters, it is able to record the history of the status of each component, monitor and control its operation, as well as perform operating tests that anticipates possible problems and allows timely maintenance scheduling. The system is especially oriented to the control of risks of explosion or fire, to the reduction of energy consumption, maintenance scheduling and to improve the filters' service-life.

DETAILED DESCRIPTION OF THE PREFERRED EMBODIMENTS

The following description is presented to enable any person skilled in the art to make and use the embodiments and is provided in the context of a particular application and its requirements.

Several modifications to the embodiments disclosed will be readily apparent to those skilled in the art and the general principles defined herein may be applied to other embodiments and applications without departing from the spirit and scope of the present disclosure. Thus, the present invention is not limited to the embodiments shown, on the contrary it must coincide with the broader scope consistent with the principles and characteristics disclosed herein.

Data structures and codes described in this detailed description are normally stored in a computer-readable storage medium, which may be any device or means that can store codes and/or data for use by a computer system. The computer-readable storage medium includes, without limitation, volatile memory, non-volatile memory, magnetic and optical storage devices such as disk drives, magnetic tapes, CDs (compact discs), DVDs (digital versatile discs or digital video discs) or other means capable of storing codes and/or data known so far or subsequently developed.

The methods and processes described in the detailed description section may be incorporated as codes and/or data, which may be store in a computer-readable storage medium as described above. When a computer system reads, and executes the code and/or data stored in the computer-readable storage medium, the computer system performs the methods and processes incorporated as data and code structures and stored in the computer-readable storage medium.

In addition, the methods and processes described herein may be included in modules and hardware devices. These modules or devices may include, but are not limited to, a chip of application-specific integrated circuit (ASIC), a field programmable gate array (FPGA), a dedicated or shared processor running a particular software module or a piece of code at a given time and/or other programmable logic devices known up to now or subsequently developed and that in this document programmable elements will be mentioned. When modules or hardware devices are activated, they perform the methods and processes included therein.

Figure 1:
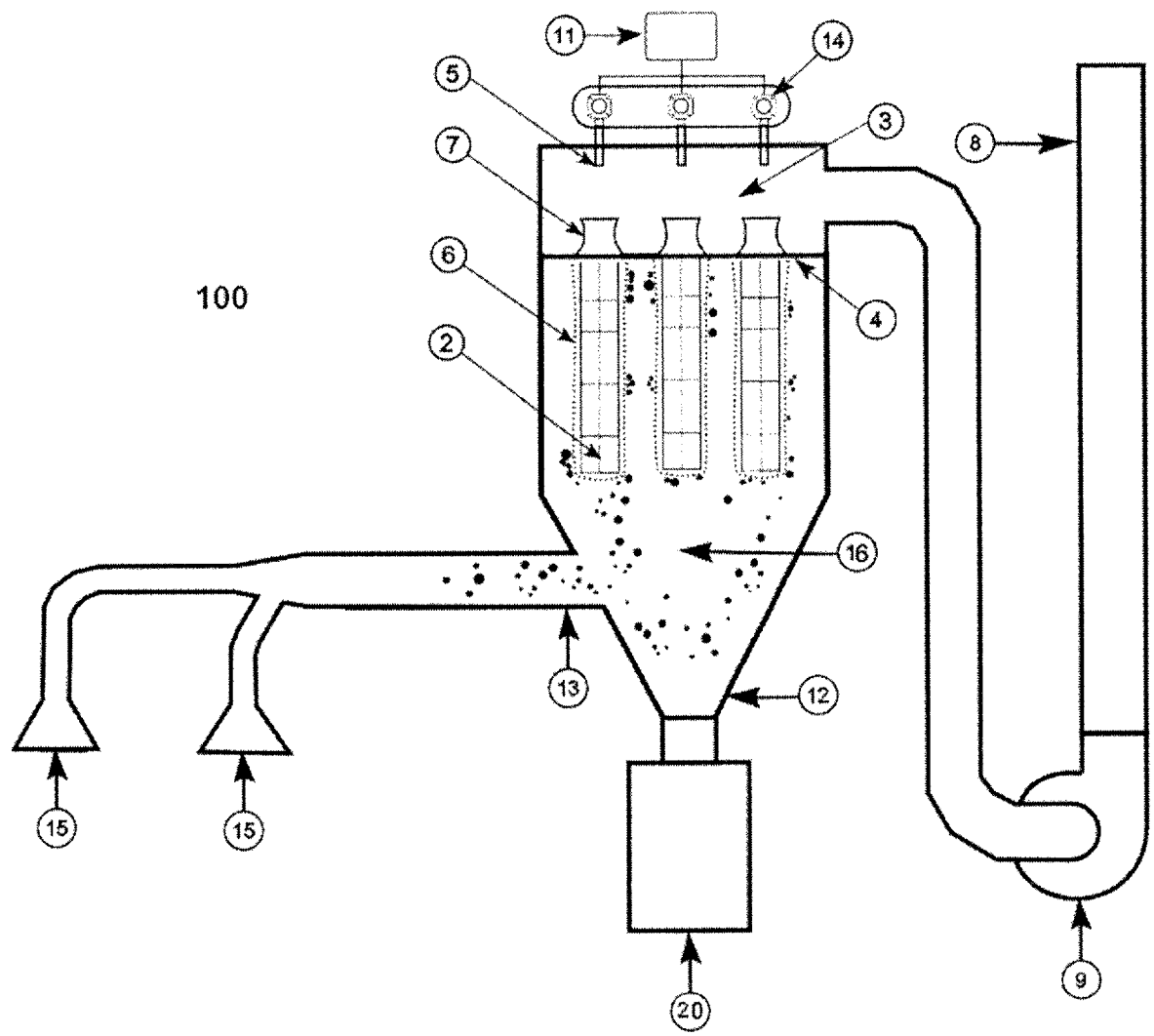
FIG. 1 shows the parts of a dust collector used in the art.
Figure 2:
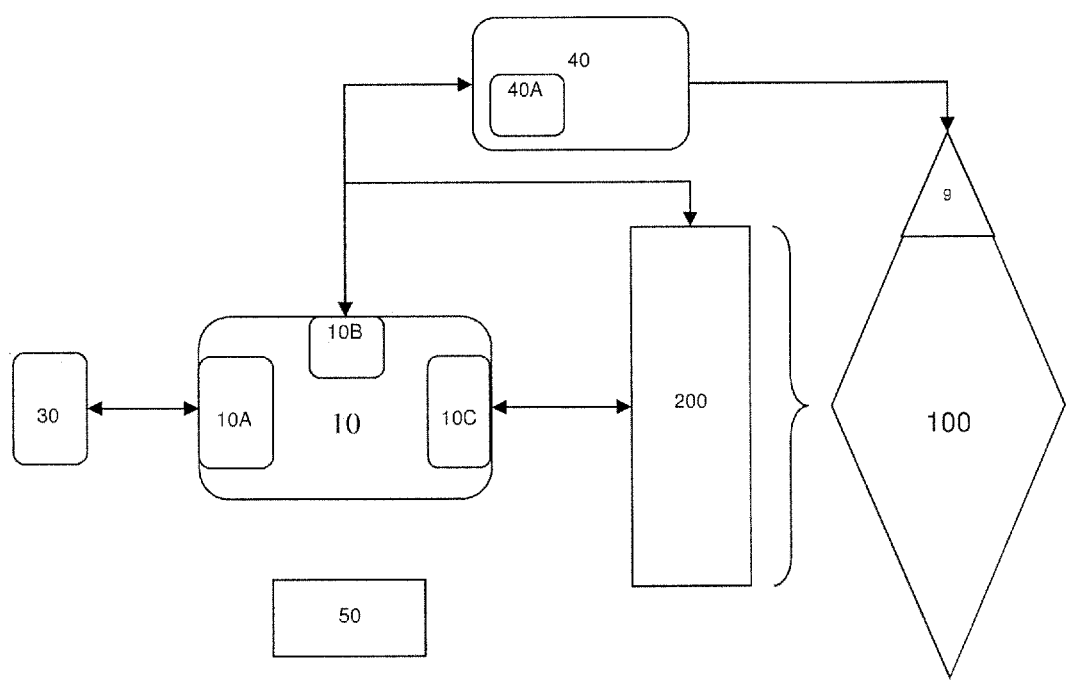
FIG. 2 shows a block diagram of an embodiment of the present invention.

FIG. 1 shows a dust collector 100 commonly known in the art. Which is comprised of a hopper 12; a bin or tank 20, wherein the collected dusts fall through the hopper; a dirty air inlet point 13, wherein the dirty air relates to the air with dusts which is extracted by means of hoods 15 installed in the pollutant emission work centers, wherein said work centers are in different configurations, which may be totally or partially linear, parallel, star, etc.; a dirty chamber 16, wherein the inlet point comes directly through a flow generated by a centrifugal fan 9; one or more filters 2, also known as bags; one or more cages 6 which support the one or more filters 2; one or more venturis 7; a mirror 4 also known as plate, wherein the cages and venturis are fixed; at least one jet pipe 5 wherein a plurality of diaphragm valves 14 is coupled, which will perform compressed air blasts within each bag 2, through each corresponding venturi 7; a timer 11 which regulates the interval between blasts of the valves and the duration thereof; a clean air chamber 3 which is where the air already filtered and forced by the fan 9 comes to exit through a stack 8. Likewise, the container or bin 20 is shown, wherein the collected dust falls. One skilled in the art will appreciate that different variations in the collector can be made, without affecting the subject matter of the present invention. FIG. 2 shows a flowchart of the system 1 of the present invention, wherein a dust collector 100 can be illustratively seen, which has a fan 9 which is used to draw air passing through one or more hoods 15 which are located in workstations, wherein said fan 9 is normally of the centrifugal type. The system 1 has a central unit 10 which includes a microcontroller 10A, which includes a memory and operation data coupled thereto; a communication port 10B for data exchange with compatible units, wherein in a preferred embodiment the data exchange is made in accordance with the Profibus communication standard, however one skilled in the art may note that the communication standard may vary without affecting the subject matter of the present invention; an input and output port 10C, wherein the inputs and outputs are of the digital and/or analog type; a configurable variable-frequency drive 40 which, in an embodiment, of the invention includes either a proportional control or a PID control 40A; a plurality of sensors 200 located in different parts of the collector 100 to obtain and register a plurality of measurements or sometimes an average of measurements, wherein the sensors 200 are in either wired or wireless communication with the central unit 10; a power source 50; and in an embodiment of the invention, a graphical user interface 30 is included.

In an embodiment of the invention, the central unit 10 includes a wireless communication module. In a preferred embodiment, the communication module is a GPRS modem that exchanges data with a server by recording the information collected by the central unit 10. The data exchange is defined, at least in part, by notifications of the system status 1 to at least one user or central.

The plurality of sensors used, already known in the art are the following: At least one level or clogging sensor of the collector hopper, which may be several depending on the size or number of hoppers, being generally located in the lower part of the hopper. This sensor controls pneumatic or mechanical vibrators also called fluidizers, used in the art to break a clogging in the hoppers.

A compressed air pressure sensor or equivalent, which is located in the compressed air inlet of the compressor. For example, if the measured pressure does not correspond to the pre-designed pressure, it means that there is a leak in the line whereby the compressed air filter cleaning system does not operate with the corresponding force. The sensor includes an electromechanical array including a cutoff electrically operated valve normally closed installed before the compressed air pressure sensor.

Thus, the compressed air pressure sensor closes the flow of compressed air in case of maintenance, leak, or emergency.

A triboelectric sensor or equivalent for detecting broken filters which is located at the stack outlet, after filtration. In an embodiment of the invention, the data collected by said sensor identify a broken filter upon detecting a peak in said data.

At least one Rate-of-Rise (ROR) heat sensor or equivalent for detecting fire in the collector 100 which is located, either in the same ductwork defined by the lines that are between the element 13 and the hoods 15, or somewhere in the collector 100 as could be the stack 8.

A fire equipment activation sensor or equivalent which is located at critical locations identified in the art. Said sensor is activated by expansion, since once expanded a rod is activated, which allows the release of extinguishing liquid. It is usually located within the collector or in the workstation, wherein a mechanism that activates the application of a specific extinguishing agent is included.

At least one temperature sensor or equivalent located in different parts of the system reporting the operation conditions of the system 1.

A first pressure differential sensor, pressure sensor or differential manometer or equivalent to indicate the pressure difference between the dirty chamber 16 and the clean chamber 3 in order to determine when the cleaning of the filters 2 is executed by means of the compressed air blasts. Said sensor makes measurements of the clean chamber and the dirty chamber. A second pressure sensor which is used to determine the pressure difference between the dirty chamber 16 and the environment, or the readings of a pitot installed in the stack 8. Thus, it is possible to indirectly determine the flow rate existing in the system 1, since there is a correlation already known in the art. When calibrating it, the flow rate can be known and thus identify whether the filters 2 require maintenance.

In an alternative embodiment, an anemometer is used to measure the airstream at the stack outlet 8, that is, to know the flow rate in the stack.

A current sensor for failure detection in the filter cleaning electrically operated valves 2.

A pivoting sensor for the rotary valve in the dust discharge of the collector which is located between the hopper 12 and the tank or bin 20. This sensor determines whether the revolutions are correct according to the design of the collector 100, so that if said rotations do not correspond to those of the design, it is inferred that maintenance is necessary, since it is possible for the bin 20 and/or the hopper 12 to be saturated, causing the filters 2 to saturate equally.

In an embodiment of the invention, a level sensor 21 of bin 20 is included, which is defined by an ultrasonic sensor which is attached to the bin cover of the bin 20 containing dust, wherein the sensor 21 makes constant measurements in the dust that accumulates. Thus, the ultrasonic measurements of the ultrasonic sensor reject the existence of dust that is falling into operation and only measurements of dust accumulating at the base of the bin 20 are taken, so which, based on a default measurement, a notification is sent to a user using some electronic communication device compatible and registered in the system of the present invention. In other words, upon detecting a solid surface the corresponding ultrasonic signal returns. Likewise, in an embodiment of the invention, the filling speed of the bin 20 is estimated through this sensor. This also allows knowing the rate of pollutant generated in real time to establish notifications, alerts and/or alarms on the filling of the bin and a possible replacement.

In an embodiment of the invention, at least one infrared spark sensor or equivalent that is in the extraction ductwork. Its quantity and location depends on the diameter of the ductwork, the angle of service, etc.

One skilled in the art may note that the communication that the sensors have with the brain may vary without affecting the subject matter of the present invention. The communication may occur through analog signals such as a signal between 0 VCD to 24 VCD, or via the RS-485 communication standard. Wherein such form of communication depends on the manufacturer.

Figure 3:
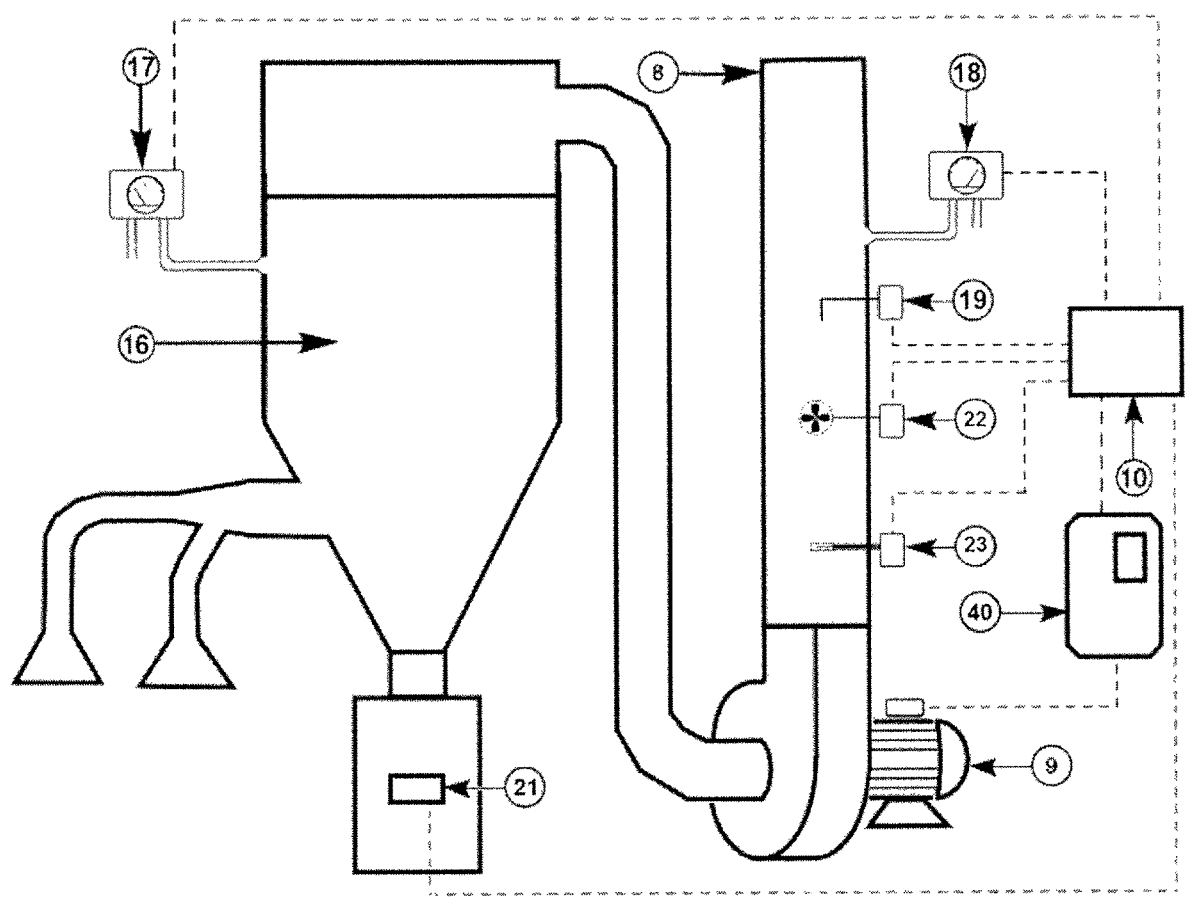
FIG. 3 shows the parts of an embodiment of the present invention, when coupled to a dust collector.

FIG. 3 shows an illustrative but non-limiting example of the system of the present invention when connecting to an average dust collector. FIG. 3 shows the different connection methods of the central unit 10 which, through a variable-frequency drive or VFD 40, regulates the fan power 9. For the operation of the flow controller at least one of a plurality of sensors 200 may be installed which, depending on the application, the budget and system requirements can be integrated. Sensors such as static pressure sensors 17 and 18, connected in dirty chamber 16 and stack 8 respectively, pitot 19, helical anemometer 22, and hotwire anemometer 23 as shown in FIG. 3.

The system of the present invention, further includes a method of operation that allows determining the service-life of the filters being used. In this respect, since the present invention enables a constant visualization and obtaining of real time data of the collector's behavior, it is possible to make estimates by extrapolation, correlation, etc., in relation to a filter's standard behavior chart that has been identified. Thus, it is possible to generate charts of the behavior of each collector according to its variables and relate them to the standard chart.

For example, pressure data generated by saturation in the filters are recorded and through an algorithm a chart that over time increases in data complementing said chart is initially generated. In this respect, if said chart or curve is correlated with a representative exponential curve as the standard service-life behavior chart, it is possible to project or extrapolate the chart and estimate the filters' service-life with certain time in advance, that is, it is possible to create estimates of the filters' service-life in a way that maintenance and/or replacement dates of said filters are anticipated.

In an embodiment of the invention, the method comprises the steps of: resetting the counter of effective filtration hours, setting it to zero for new filters and resetting each subsequent filter change back to zero; determining the type or types of pollutants, wherein data such as particle size and the different particle types are included, thereby defining a correction factor 1, in an embodiment of the invention said correction factor 1 is determined from a historical record of data obtained in different collectors; determining the type of filter medium and/or type of filter thus defining a correction factor 2, wherein said correction factor 2 corresponds to the type of filter. In this respect, it is known in the art that different filters apply to the same particle, however its cost, quality, and/or duration is different; determining control delta p incremental DPC1, DPC2, DPC3, etc., in accordance with the time TDPC1, TDPC2, TDPC3, etc., from the correction factors 1 and 2, and the standard service-life behavior chart identified in FIG. 4.

In an embodiment of the invention, the actual operational temperature is determined by means of the temperature sensors in order to calculate an historical average of air density; regulate the air flow through the variable-frequency drive controlling the fan speed; perform a first average measurement of the pressure difference between the dirty chamber and the clean chamber thus defining the variable p1 in an operating time span t1; perform a second average measurement of the pressure difference between the dirty chamber and the clean chamber thus defining the variable p2 in an operating time span t2; in case the second measurement p2 is greater than the first measurement p1 and corresponding to DPC1, determine the "real time span" TDPR1 between the first and second measurement p1 and p2 respectively, wherein it is assumed that the frequency drive, either to increase and/or decrease the fan speed, is adjusted in proportion to the difference between said first and second measurement by compensating the saturation of the filters to maintain the preset flow, that is, the preset flow, whenever the pressure of the filters varies; make a relation between TDPR1 with TDPC1 to obtain the corrected time factor TDPCO1. In an embodiment of the invention said relation is defined either by a correlation, a comparison, an extrapolation or any other mathematical relation to obtain a corresponding result; perform a third average measurement p3 of the pressure difference between the dirty chamber and the clean chamber in the time span t3; in case the third measurement p3 is greater than the measurement p2 corresponding to DPC2, determine the time span TDPR2 between the p2 and the third measurement p3; make a relation between TDPR2 and TDPC2 to obtain the corrected time factor TDPCO2. In an embodiment of the invention said relation is defined either by a correlation, a comparison, an extrapolation or any other mathematical relation to obtain a corresponding result; based on the time spans determined TDPCO1, TDPCO2, TDPCO3, etc., determine the filters' service-life through a relation between said corrected real times and the standard service-life behavior chart of a filter such as that shown in FIG. 4. In an embodiment of the invention said relation is defined either by a correlation, a comparison, an extrapolation or any other mathematical relation to obtain a corresponding and applicable result.

Figure 4:
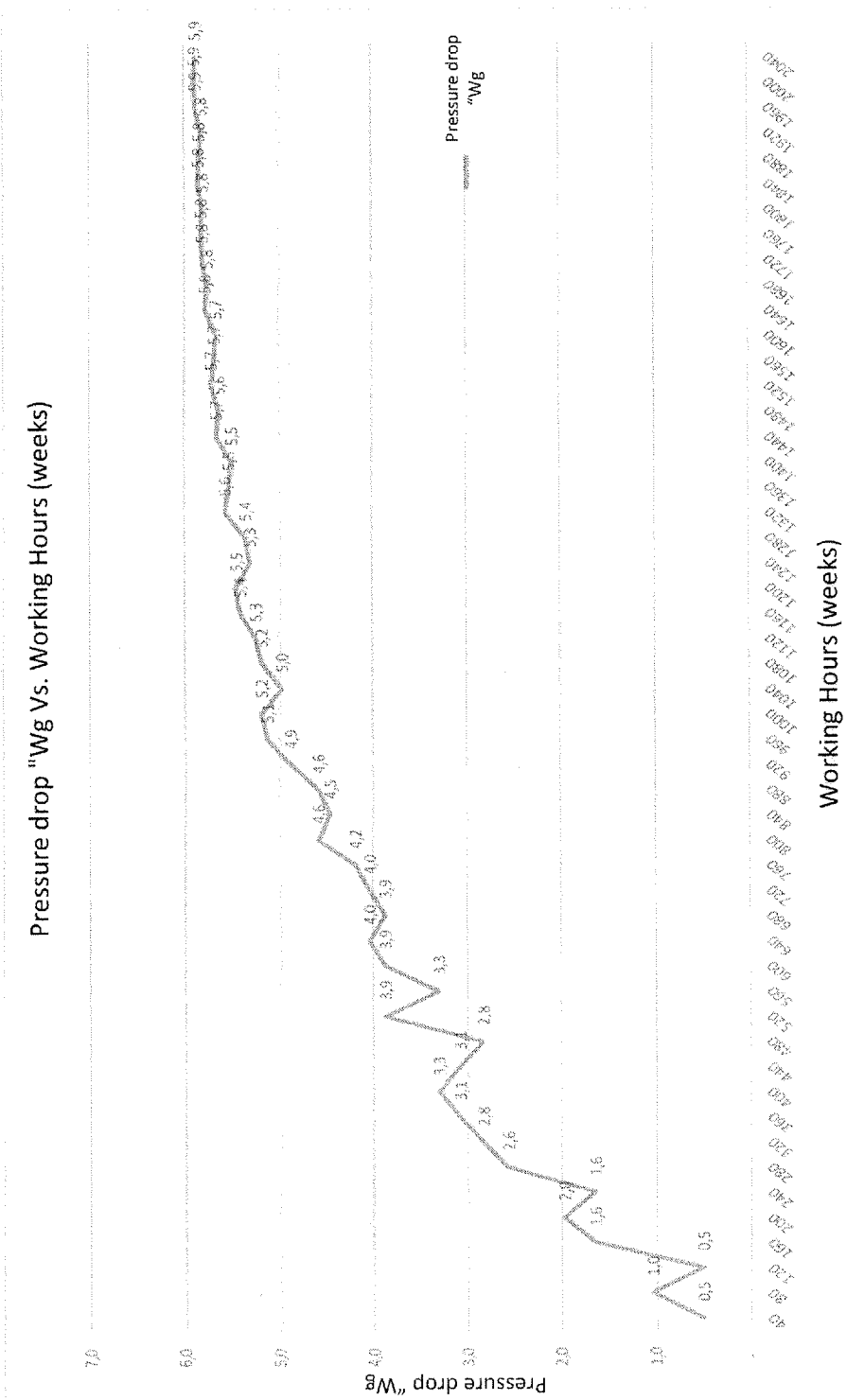
FIG. 4 shows the behavior chart of standard filter's service-life, considering pressure drop VS Working Hours.

The above steps are repeated for N time spans, that is, for TDPCO3, TDPCO4, TDPCO5, TDPCO6, etc., until the data allow defining and performing the estimation based on said chart shown in FIG. 4.

The number of measurements, or average of measurements, as well as the time spans and the number of locations wherein the measurements are made may vary without affecting the subject matter of the present invention. Likewise, the standard service-life behavior chart may vary without affecting the subject matter of the present invention.

Also, the present invention includes methods for the system's finalization and initialization in order to maintain a performance by reducing the resources used.

In an embodiment of the invention, a method to start a dust collector system is included which consists of activating the compressed air blasts and turning the fan on at a maximum power.

It will be apparent to those skilled in the art that several modifications and variations may be made in the present invention without departing from the scope or spirit of the invention. Other embodiments of the invention will be apparent to those skilled in the art from the consideration of the specification and practice of the invention described herein. It is intended that the specification and examples be considered as exemplary only with a true scope and spirit of the invention being indicated by the appended claims.

The invention claimed is:

1. A system for controlling a dust collector system including a fan, dust filters of fabric and a bin for dust, the system comprising:
   a central unit including particular operating air-fabric ratio for the dust to be collected;
   a variable-frequency drive for adjusting the operating speed of the fan of the collector system;
   at least one air speed sensor for providing air speed readings in the fan exhaust stack;
   at least one air pressure sensor for providing static pressure reading between the environment and the dirty chamber;
   at least one pressure sensor for providing total pressure readings in the fan exhaust stack;
   an ultrasonic sensor installed at the top of the bin pointing to the base where the dust is accumulated;
   wherein the ultrasonic sensor is configured to reject the detection of dust that is falling to the base of the bin; and
   wherein the variable-frequency drive adjusts the operating speed of the fan, during operation, to compensate the variation of the air-fabric ratio based on at least one reading selected from the list of: the static pressure reading between the environment and the dirty chamber, air speed reading in the fan exhaust stack, and the total pressure reading in the tan exhaust stack.

2. The system according to claim 1, wherein the variable-frequency drive includes a PID control.

3. The system according to claim 1, wherein the variable-frequency drive includes a proportional control.

4. The system according to claim 1, wherein the air speed sensor is defined by an analog signal that comes from either a helical or hot wire speed sensor.

5. The system according to claim 1, wherein the total pressure is provided by a Pitot tube installed in the air exhaust stack of the fan.

6. The system according to claim 1, wherein the system further comprises a plurality of sensors defined by at least one sensor selected from the list of: compressed air pressure sensor, triboelectric sensor for detecting broken bags, Rate-of-Rise (ROR) heat sensor for fire detection, fire equipment activation sensor, pressure sensor for cleaning filters, anemometer for measuring airstream at the stack outlet, current sensor for failure detection in the filter cleaning electrically operated valves, pivoting sensor for rotary valve and/or helical conveyer in the dust discharge of the collector, hopper level sensor and/or infrared spark sensor in the extraction ductwork.

7. The system according to claim 1, wherein notification of replacement of the bin is sent to the user based on the speed of dust being accumulated in the bin.

\* \* \* \* \*